United States Patent [19]

De Ladurantaye et al.

[11] Patent Number: 5,595,128
[45] Date of Patent: Jan. 21, 1997

[54] TABLE ASSEMBLY

[75] Inventors: Yvon De Ladurantaye, Ste-Madeleine; Koen De Winter, Beaconsfield, both of Canada

[73] Assignee: Dycaf Pro-Vision International, Quebec, Canada

[21] Appl. No.: 518,115

[22] Filed: Aug. 28, 1995

[51] Int. Cl.⁶ .............................. A47B 11/00; A47B 9/14
[52] U.S. Cl. ................. 108/140; 108/141; 108/142; 108/146; 248/188.5; 248/409; 403/328
[58] Field of Search ..................... 108/140, 141, 108/142, 146, 148, 94, 95; 248/214, 397, 408, 409, 188.5; 403/328, 108, 324, 109, 377

[56] References Cited

U.S. PATENT DOCUMENTS

| | | | |
|---|---|---|---|
| 1,683,944 | 9/1928 | Balch | 108/141 |
| 1,859,719 | 5/1932 | Schrage . | |
| 3,111,123 | 11/1963 | Le Fort | 126/137 |
| 3,157,379 | 11/1964 | Platakis | 248/278 |
| 3,304,892 | 2/1967 | Bengtson | 108/136 |
| 3,742,209 | 6/1973 | Williams | 240/73 |
| 3,920,276 | 11/1975 | Sparrow | 297/142 |
| 3,926,532 | 12/1975 | Schlenker et al. | 403/328 X |
| 4,086,859 | 5/1978 | Dondero | 108/142 |
| 4,183,489 | 1/1980 | Copher et al. | 248/278 |
| 4,524,701 | 6/1985 | Chappell | 108/44 |
| 4,672,898 | 6/1987 | Davidson | 108/6 |
| 4,676,547 | 6/1987 | Spillman | 297/4 |
| 4,711,595 | 12/1987 | Magid et al. | 403/108 |
| 4,834,413 | 5/1989 | Patel et al. | 403/108 X |
| 5,385,323 | 1/1995 | Garelick | 248/288.5 X |

FOREIGN PATENT DOCUMENTS

| | | | |
|---|---|---|---|
| 1193928 | of 1959 | France | 108/146 |
| 2284060 | 4/1976 | France | 248/214 |
| 2830945 | 1/1980 | Germany | 403/328 |

*Primary Examiner*—Peter M. Cuomo
*Assistant Examiner*—Hanh V. Tran
*Attorney, Agent, or Firm*—Merchant, Gould Smith, Edell Welter and Schmidt

[57] ABSTRACT

The table assembly comprises a first longitudinally grooved and elongated supporting member disposed substantially vertically. A mounting device removably connects the first supporting member to a fixed structure. A second longitudinally grooved and elongated supporting member is disposed substantially horizontally and bears a table plate at its distal end. The first and the second supporting member are connected together by a brace member. A first locking device is provided between the brace member and the first supporting member for locking the brace member on the first supporting member. A second locking device is provided between the second supporting member and the brace member for locking the second supporting member in the brace member at a selected height. The table assembly is easily adjustable in a wide range of positions and foldable away for storage. It is particularly well adapted for use on locations where space is limited, such as balconies, patios, decks, verandas, mobile homes, boats, etc.

11 Claims, 9 Drawing Sheets

1

TABLE ASSEMBLY

FIELD OF THE INVENTION

The present invention relates to a table assembly, easily adjustable in a wide range of positions and foldable away for storage, and that is particularly well adapted for use in locations where space is limited.

BACKGROUND OF THE INVENTION

There are many locations where space is limited but where the occupants still need a minimum comfort and convenience in spite of the small or compact space. Examples of such locations are balconies, patios, decks, verandas, mobile homes, boats, etc. One universally convenient object to have next to the occupants in these locations is a table. However, a regular table often does not have or leave enough free space. This problem is even amplified if the location is a passageway.

Some prior art documents disclose tables adapted for small or compact locations and which may fold away or be disassembled for storage. These tables are generally used by the occupants while they sit in the location and are subsequently stored. Examples of such prior art documents are U.S. Pat. No. 4,086,859 (Dondero) of 1978, U.S. Pat. No. 4,672,898 (Davidson) of 1987, U.S. Pat. No. 4,889,057 (Chartrand) of 1989, and U.S. Pat. No. 4,998,484 (Groetzinger) of 1991.

While some prior art attempts to provide tables for small or compact locations have resulted in a number of different constructions, none has been found completely satisfactory.

SUMMARY OF THE INVENTION

The object of the present invention is to provide a new combination for a table assembly that is easily adjustable in a wide range of positions, foldable away for storage and well adapted for use in locations where space is limited.

More particularly, the object of the present invention is to provide a table assembly comprising:
a first longitudinally grooved and elongated supporting member disposed substantially vertically;
a second longitudinally grooved and elongated supporting member disposed substantially horizontally;
a brace member for operatively connecting together the first and second supporting members, the brace member having a first sleeve portion slidably connected to the first supporting member and a second sleeve portion slidably connected to the second supporting member;
a first locking means provided between the brace member and the first supporting member for removably locking the brace member with the first supporting member;
a second locking means provided between the second supporting member and the brace member for removably locking the second supporting member with the brace member; and
a table plate connected to a distal end of the second supporting member.

A non restrictive description of a preferred embodiment will now be given with reference to the appended drawings.

IDENTIFICATION OF THE COMPONENTS

Figure 1:
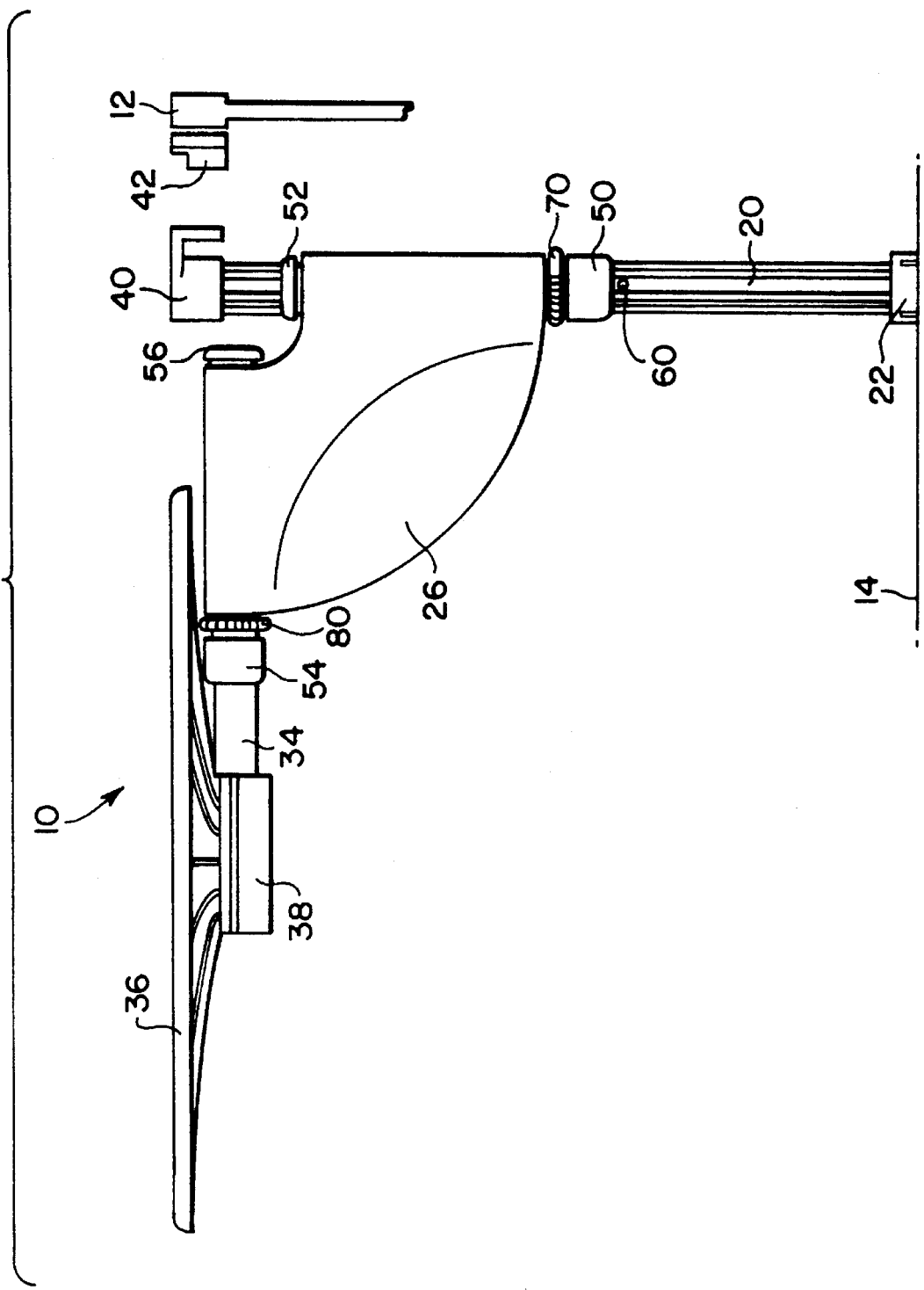
FIG. 1 is a side elevational view of the table assembly according to the present invention.

The following is a list of the components found in the drawings and in the description of a preferred embodiment:
10 table assembly
12 elevated fixed location
14 floor
20 first supporting member
21 grooves (of the first supporting member)
22 base
24 screws (for the base)
26 brace member
28 first sleeve portion
29 second sleeve portion
30 first tubular section
32 second tubular section
34 second supporting member
35 grooves (of the second supporting member)
36 table plate
38 plate base
40 anchoring tip
42 mounting bracket
44 screws (for the mounting bracket)
46 locking member
50 first guiding member
52 second guiding member
54 third guiding member
56 fourth guiding member
60 safety stoppers
62 outwardly biased portions
64 springs (of the safety stoppers)
66 channels (inside the first supporting member)
68 holes (for the safety stoppers)
70 first eccentric ring
72 first stopper
74 spring (for the first stopper)
76 protuberance (on the first tubular section)
77 hole (in the first tubular section)
78 first adjustment holes (for the first stopper)
80 second eccentric ring po9 82 second stopper 84 spring (for the second stopper)
86 protuberance (on the second tubular section)
88 hole (in the second tubular section)
90 second adjustment holes (for the second stopper)

DESCRIPTION OF A PREFERRED EMBODIMENT

Referring to the drawings, there is shown a table assembly (10) according to the present invention. The table assembly (10) is able to fold away for storage, which makes it particularly suitable for locations where space is limited but where the occupants still need a minimum comfort and convenience in spite of the small or compact space. Examples of such locations are balconies, patios, decks, verandas, mobile homes, boats, etc. Most elements of the table assembly (10) can be made of plastic.

The table assembly (10) comprises a first longitudinally grooved and elongated supporting member (20) disposed substantially vertically. It preferably has a generally circular cross section, as shown for example in FIG. 2. The first supporting member (20) bears most of the elements of the table assembly (10), as explained hereinafter.

In the preferred embodiment, the longitudinal surface grooves (21) of the first supporting member (20) extend from end to end, which is therefore very suitable for a plastic extrusion. They are also evenly distributed and have a parallelepiped cross section. Of course, other shapes and arrangements are possible.

The first supporting member (20) is removably connected to a fixed structure by mounting means shown in FIGS. 1, 2, 5 and 6. The fixed structure is for example a balcony and the first supporting means (20) is removably connected to it so that the table assembly (10) may be removed wherever necessary, such as during winter. The mounting means preferably comprise a base (22) rigidly connected to the fixed structure, more particularly to the floor (14), for removably receiving the lower end of the first supporting member (20). The base (22) may be secured to the floor (14) by means of screws (24).

Figure 6:
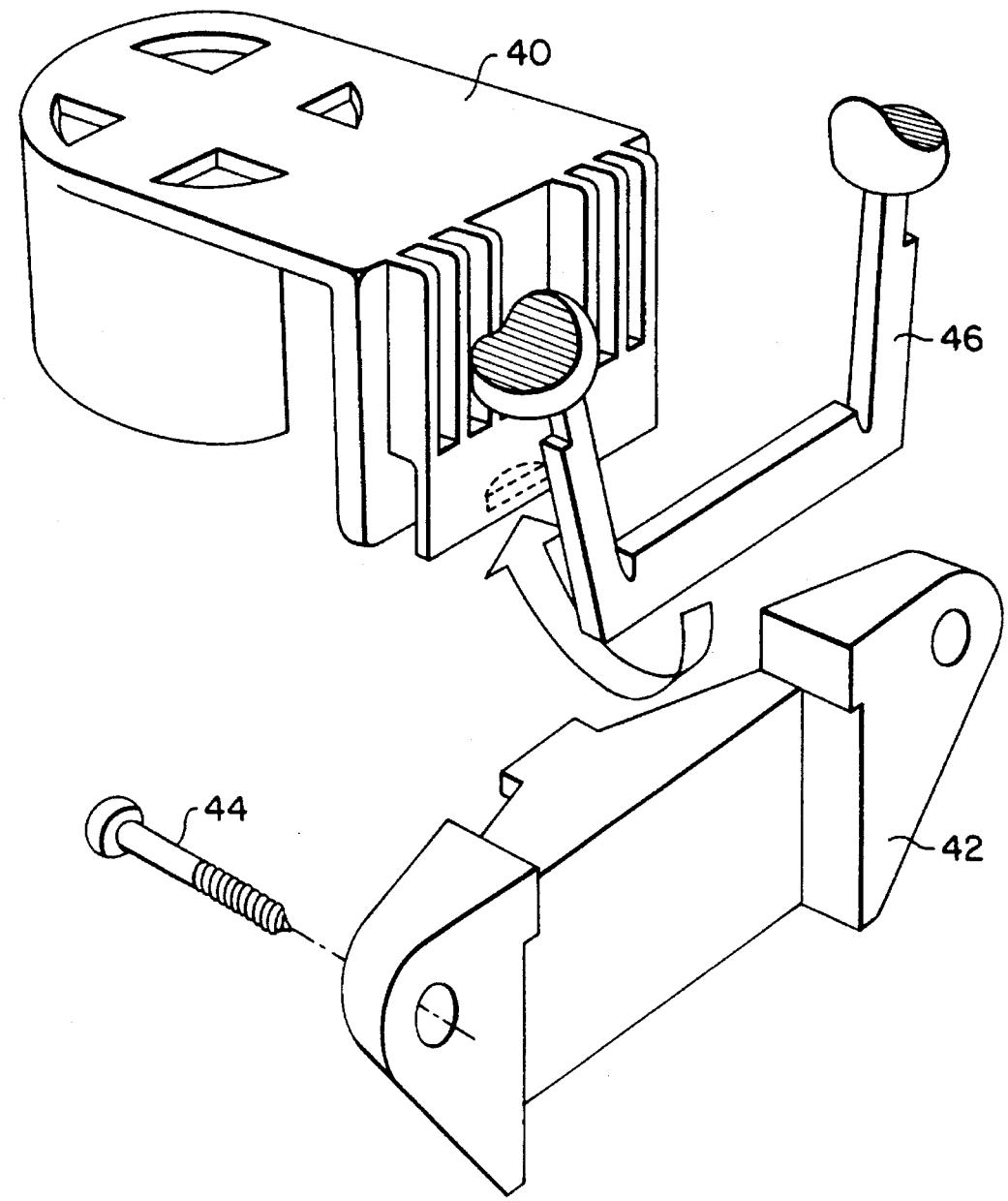
FIG. 6 is a view similar to FIG. 5, further showing the locking member.

An upper anchoring assembly, which is part of the mounting means, is further provided for removably connecting the upper end of the first supporting member (20) to the fixed structure, more particularly to an elevated fixed location (12), such as a balustrade in case the location is a balcony. The upper anchoring assembly comprises an anchoring tip (40), attached to the upper end of the first supporting member (20), connectable to a mounting bracket (42). The mounting bracket (42) is rigidly connected to an elevated fixed location (12) of the fixed structure, preferably by means of screws (44). In the preferred embodiment, and as shown in FIG. 6, the anchoring tip (40) and the mounting bracket (42) are connected together in a locking engagement by means of a locking member (46).

The table assembly (10) further comprises a second longitudinally grooved supporting member (34) disposed substantially horizontally. In the preferred embodiment, the second supporting member (34) has a generally circular cross section similar to the one of the first supporting member (20). The table plate (36) of the table assembly (10) is connected by its base (38) to the distal end of the second supporting member (34).

Figure 2:
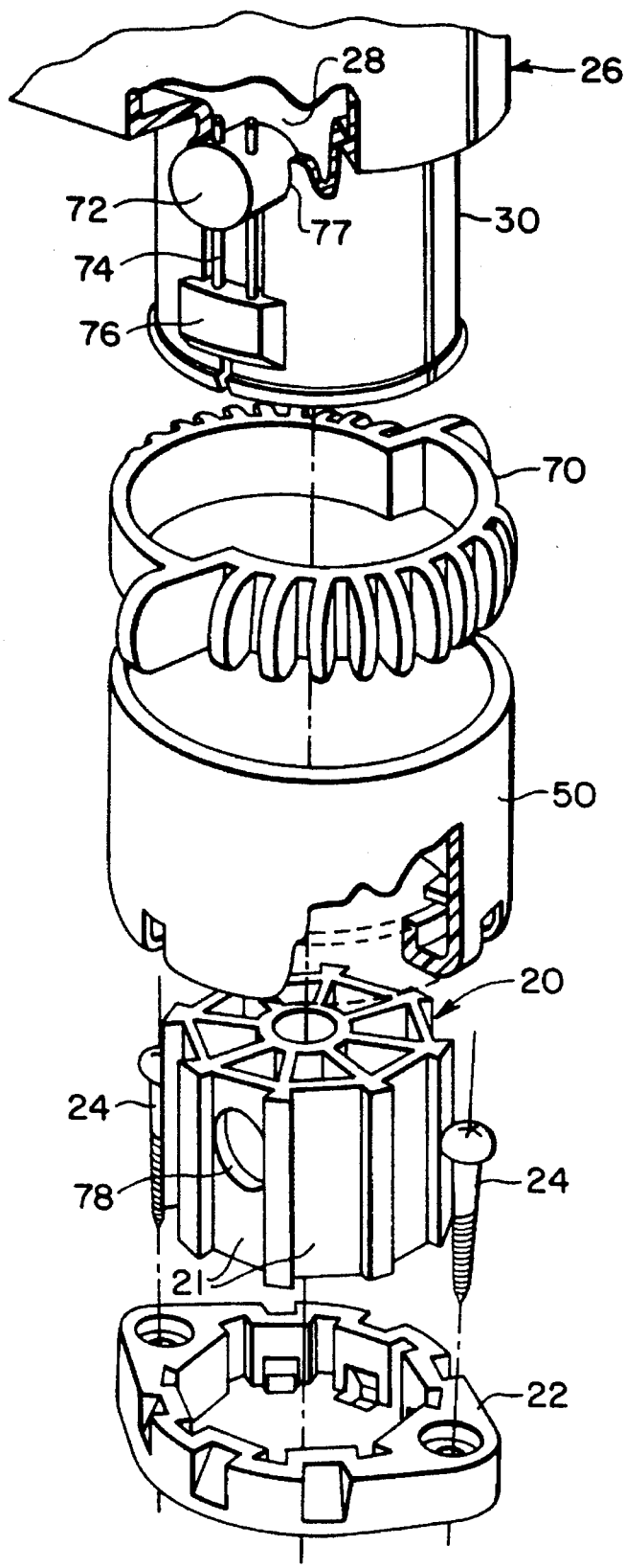
FIG. 2 is an exploded enlarged view of the table assembly of FIG. 1, showing an embodiment of the first locking means, the base and portions of the first supporting member and the brace member.
Figure 3:
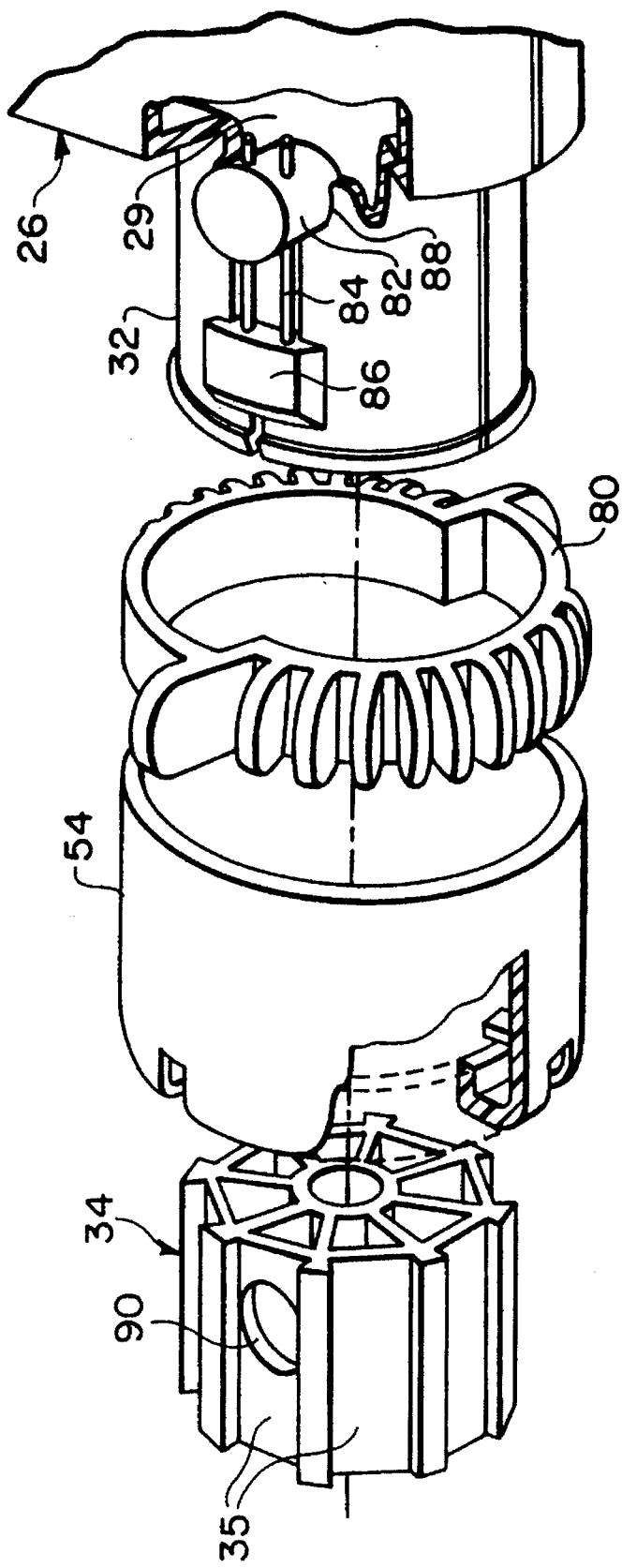
FIG. 3 is an exploded enlarged view of the table assembly of FIG. 1, showing an embodiment of the second locking means and portions of the second supporting member and the brace member.

A brace member (26) is provided for connecting together the first (20) and the second supporting member (34). The brace member (26) has a first sleeve portion (28) slidably connected on the first supporting member (20) and a second sleeve portion (29) slidably connected on the second supporting member (34). The brace member (26) comprises a first (30) and a second tubular section (32). As shown in FIG. 2, the first tubular section (30) is coaxial with the first supporting member (20) and downwardly projects from the first sleeve portion (28) of the brace member (26). As shown in FIG. 3, the second tubular section (32) is coaxial with the second supporting member (34) and laterally projects from the second sleeve portion (29) of the brace member (26) towards the distal end of the second supporting member (34).

The table assembly (10) is further provided with a first locking means between the brace member (26) and the first supporting member (20) for removably locking the brace member (26) on the first supporting member (20). The purpose of the first locking means is to adjust the height and the orientation of the brace member (26), therefore of the table plate (36), relative to the first supporting member (20). A similar second locking means is also provided between the second supporting member (34) and the brace member (26) for removably locking the second supporting member (34) in the brace member (26).

As shown in FIG. 2, the first locking means preferably comprises at least one first outwardly biased radial stopper (72) movable through a corresponding hole (77) of the first tubular section (30) upon rotation of a first eccentric ring (70) mounted around the first tubular section (30) in front of the first stopper (72). In the preferred embodiment, the first stopper (72) is a cylindrical piece, with rounded ends, biased outwardly by a metallic spring (74), itself attached to a protuberance (76) projecting on the side of the first tubular section (30). The diameter of the first stopper (72) is smaller than the width of the grooves (21), as apparent to a person skilled in the art.

The first stopper (72) may be set in different positions: a first position away from the first supporting member (20) for allowing free rotation and translation of the brace member (26) with reference to the first supporting member (20), a second position where the first stopper (72) is set into one longitudinal groove (21) of the first supporting member (20) for only preventing the brace member (26) from rotating around the first supporting member (20), and a third position where the first stopper (72) is extending inside one of a plurality of first adjustment holes (78) provided at different heights on the first supporting member (20) for further preventing translation of the brace member (26) along the first supporting member (20).

As shown in FIG. 3, the second locking means is very similar to the first one. It comprises at least one second outwardly biased radial stopper (82) movable through a corresponding hole (88) of the second tubular section (32) upon rotation of a second eccentric ring (80) mounted around the second tubular section (32) in front of the second stopper (82). In the preferred embodiment, the second stopper (82) is a cylindrical piece, with rounded ends, biased outwardly by a metallic spring (84), itself attached to a protuberance (86) projecting on the side of the second tubular section (32). The diameter of the second stopper (82) is smaller than the width of the grooves (35), as apparent to a person skilled in the art.

The second stopper (82) may be set in different positions: a first position away from the second supporting member for allowing free rotation and translation of the second support member (34) with reference to the brace member (26), a second position where the second stopper (82) is set into one longitudinal groove (35) of the second supporting member for only preventing the second supporting member (34) from rotating in the brace member (26), and a third position where the second stopper is extending inside one of a plurality of second adjustment holes (90) provided at different locations along the corresponding groove (35) of the second supporting member (34) for further preventing translation of the second supporting member (34) with reference to the brace member (26). Alternatively, the second stopper (82) may be pressed against the bottom of the corresponding groove (35) for preventing the translation by friction contact.

Figure 4:
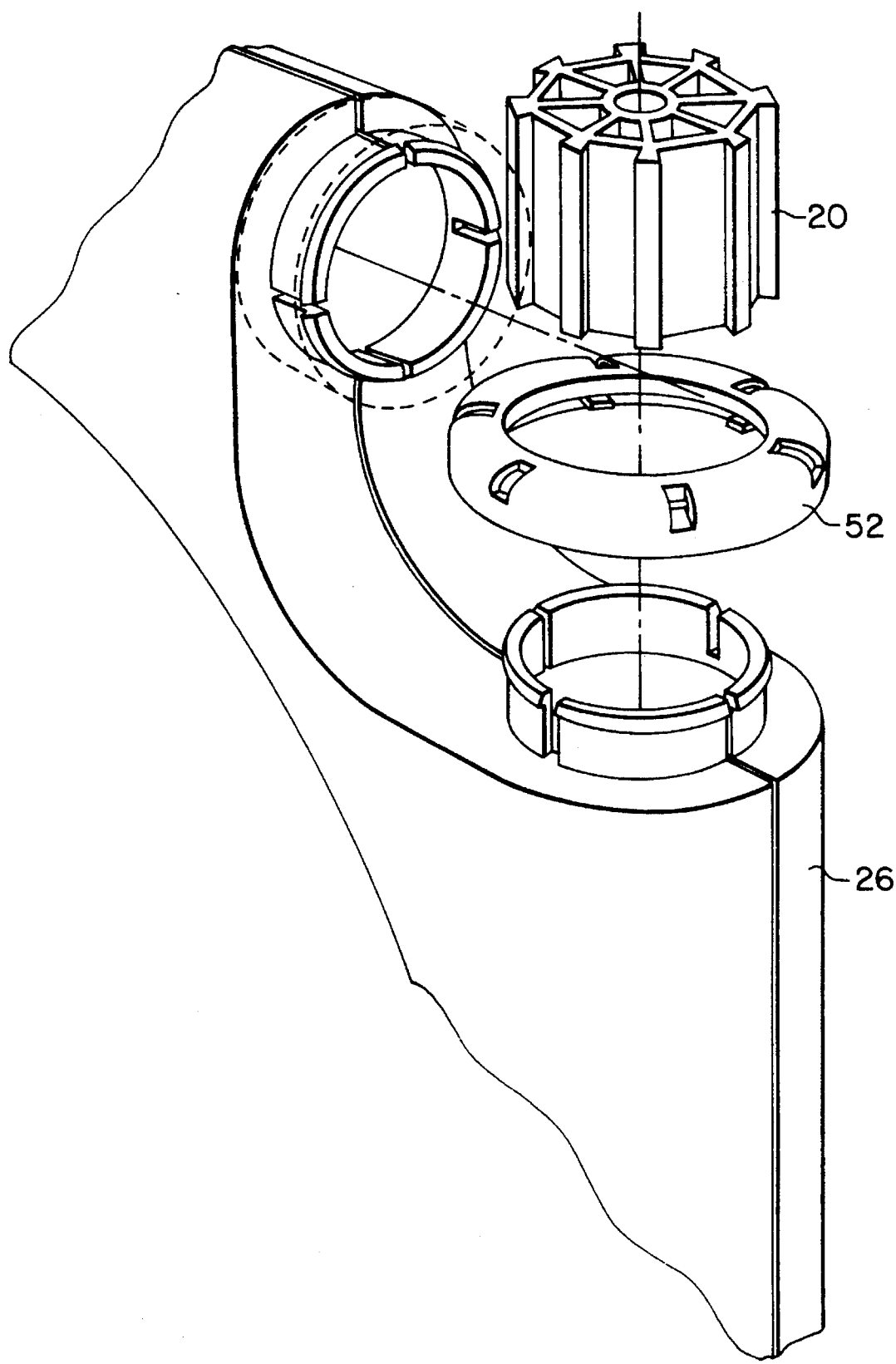
FIG. 4 is an exploded enlarged view of the table assembly of FIG. 1, showing the second guiding member and a portion of the first supporting member and the brace member.
Figure 5:
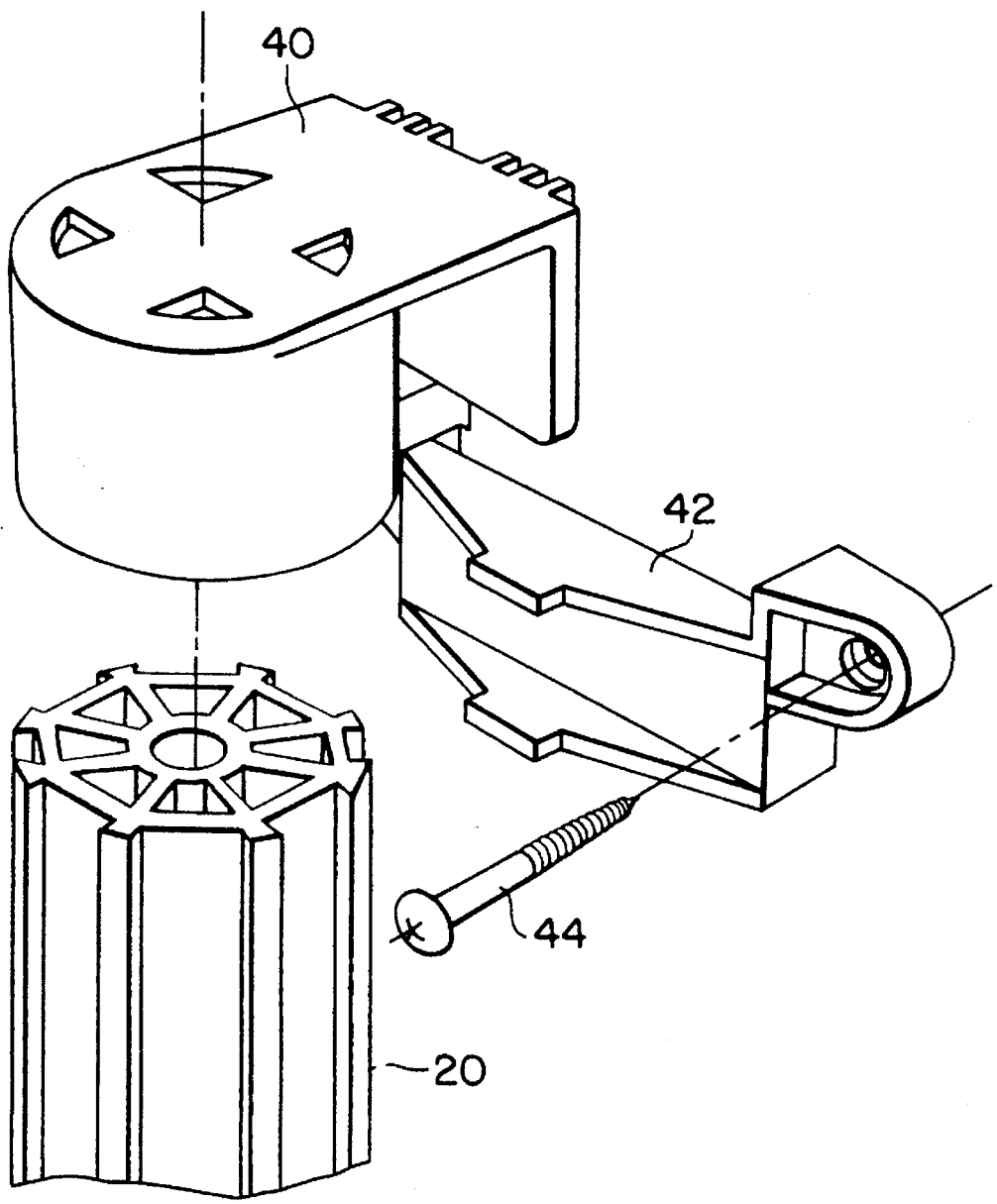
FIG. 5 is an exploded enlarged view of the table assembly of FIG. 1, showing the anchoring tip and the mounting bracket.

In order to guide the movements of the brace member (26) along the first supporting member (20), a first (50) and a second guiding member (52) may be connected to the brace member (26). Both are coaxial with the first supporting member (20) and in mesh with its grooves (21). They have an inner diameter slightly larger than the first supporting member (20) for allowing the sliding movement. The first guiding member (50) is preferably a large ring interlocked with the first tubular section (30) and that further holds the first eccentric ring (70). The second guiding member (52) is a smaller ring connected to an opposite end of the first sleeve portion (28) of the brace member (26), as shown in FIG. 4.

For guiding the movements of the second supporting member (34) in the brace member (26), a third (54) and a fourth guiding member (56) are connected to the brace member (26). Both are coaxial with the second supporting member (34) and in mesh with its grooves (35). They have an inner diameter slightly larger than the second supporting member (34) for allowing the sliding movement. The third guiding member (54) is preferably a large ring interlocked with the second tubular section (32) and that further holds the second eccentric ring (80). The fourth guiding member (56) is a smaller ring connected to an opposite end of the second sleeve portion (29) of the brace member (26).

In use, the table plate (36) can be easily set in a horizontal position by adjusting the first and second locking means, which allows respectively to adjust the height and the lateral extension of the second supporting member (34), and therefore of the table plate (36). Additionally, the arrangement of the second locking means provides a relative safety when adjusting the extension of the second supporting member (34) relative to the brace member (26) because the second eccentric ring (80) can be turned slightly for releasing the second stopper (82) from the corresponding hole (90) or from full contact with the bottom of the corresponding groove (35) without having to pull the second stopper (82) completely out of the groove (35). This can prevent the table plate (36) from tilting if it is unevenly loaded during the adjustment.

To fold away the table assembly (10) for storage, the user only has to operate the first and second locking means to release the first (72) and the second stopper (82) and further move the elements by hand. This operation is usually achieved by tilting the table plate (36) in a vertical position and rotating it, for instance, against the wall or the balustrade.

The table assembly (10) may also further comprise at least one pair of safety stoppers (60) located at a given height along the first supporting member (20) for preventing the brace member (26) from accidentally dropping from a normal operation position all the way down to the base (22) upon a mishandling of the table assembly (10). Since the brace member (26) is normally held at the upper portion of the first supporting member (20), the safety stoppers (60) may restrict damages if someone drops the brace member (26) during an adjustment. The safety stoppers (60) may also be useful for preventing children from sliding the brace member (26) when the table assembly (10) is in the storage position.

Figure 8:
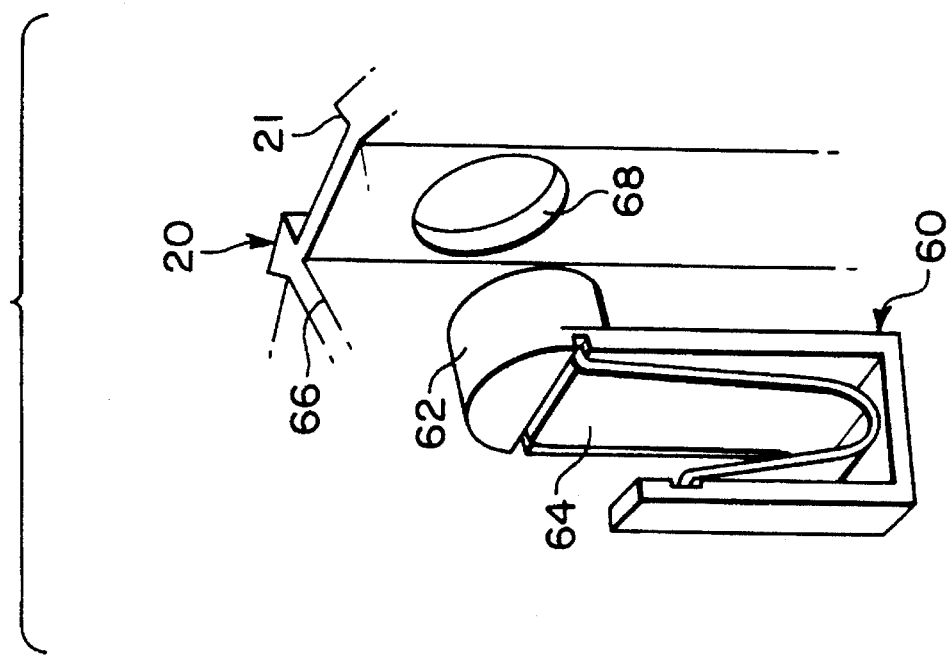
FIG. 8 is an enlarged perspective view of the safety stoppers shown in FIG. 7.
Figure 7:
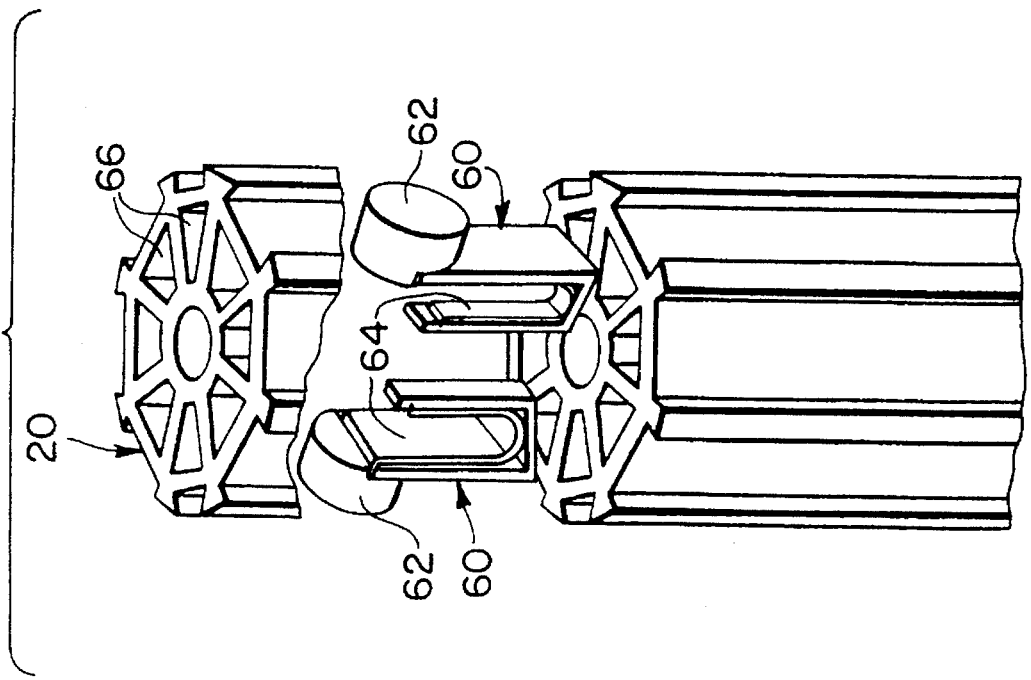
FIG. 7 is a cut-away view of the first supporting member of the table assembly of FIG. 1, showing the safety stoppers.
Figure 9:
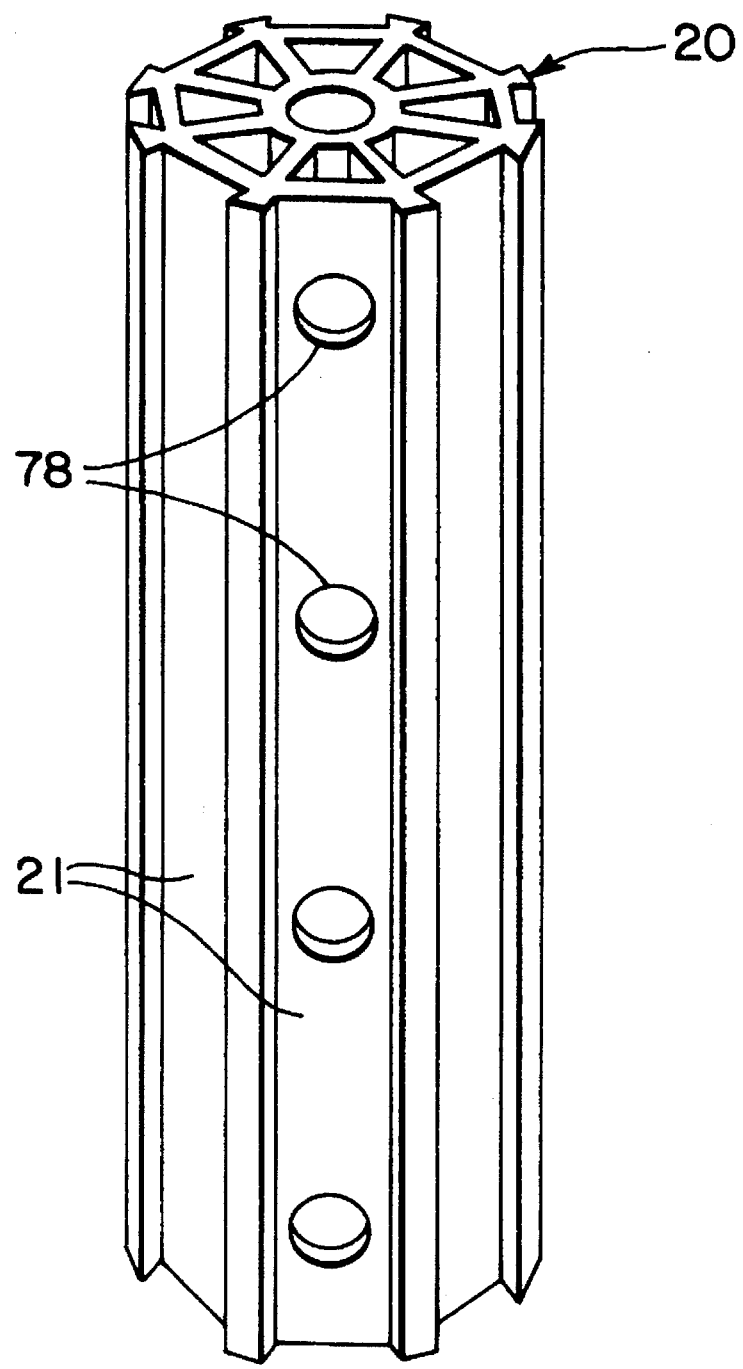
FIG. 9 is a perspective view of a portion of a first supporting member of the table assembly of FIG. 1.
Figure 10:
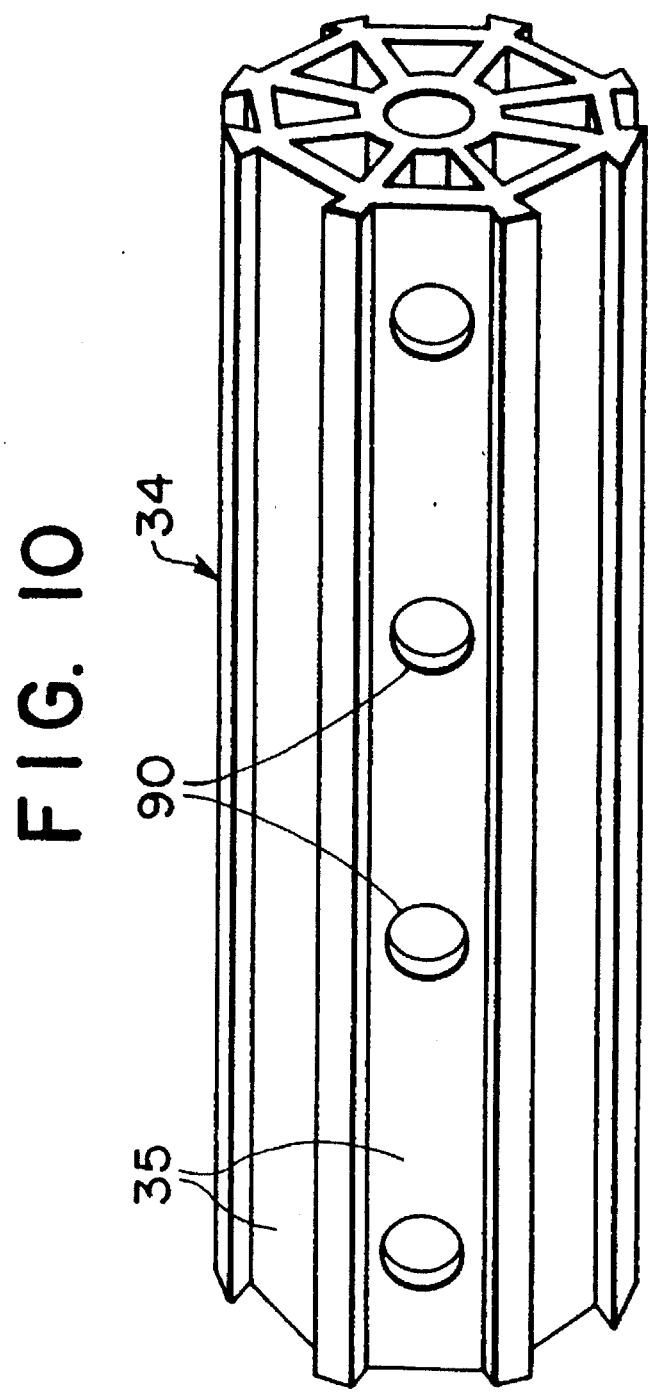
FIG. 10 is a perspective view of a portion of the second supporting member of the table assembly of FIG. 1.

As shown in FIGS. 7 and 8, each safety stopper (60) is inserted in a corresponding channel (66) inside the first supporting member (20) and has an outwardly biased portion (62) projecting outside from a corresponding hole (68) made in the first supporting member (20). Each portion (62) is preferably biased by a metallic spring (64). The use of a metallic spring is preferred because it is less likely to loose its elasticity over time than plastic. To allow the movement of the brace member (26) over the safety stoppers (60), the user only has to push inside the projecting portions (62) with its fingers and release them afterwards.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A table assembly comprising:

a first longitudinally grooved and elongated supporting member disposed substantially vertically, the first supporting member having a generally circular cross section;

a second longitudinally grooved and elongated supporting member disposed substantially horizontally, the second supporting member having a generally circular cross section;

a brace member for operatively connecting together the first and second supporting members, the brace member having a first sleeve portion slidably connected to the first supporting member and a second sleeve portion slidably connected to the second supporting member, the brace member comprising a first and a second tubular section, the first tubular section being coaxial with the first supporting member and downwardly projecting from the first sleeve portion of the brace member, the second tubular section being coaxial with the second supporting member and laterally projecting from the second sleeve portion of the brace member towards the distal end of the second supporting member;

a first locking means provided between the brace member and the first supporting member for removably locking the brace member with the first supporting member, the first locking means comprising at least one first outwardly biased radial stopper movable through a corresponding hole of the first tubular section upon rotation of a first eccentric ring mounted around the first tubular section in front of the first stopper, the first stopper having a first position away from the first supporting member for allowing free rotation and translation of the brace member with reference to the first supporting member, a second position where the first stopper is set into one longitudinal groove of the first supporting member for only preventing the brace member from rotating around the first supporting member, and a third position where the first stopper is extending inside one of a plurality of first adjustment holes provided at different heights on the first supporting member for further preventing translation of the brace member along the first supporting member;

a second locking means provided between the second supporting member and the brace member for removably locking the second supporting member with the brace member;

a table plate connected to a distal end of the second supporting member; and mounting means for removably connecting the first supporting member to a fixed structure.

2. A table assembly according to claim 1, further comprising a first and a second guiding member connected to the brace member and coaxial with the first supporting member for guiding movements of the brace member thereon, the first and the second guiding means having an inner diameter slightly larger than the first supporting member, the first guiding member being interlocked with the first tubular section and holds the first eccentric ring, the second guiding member being connected to an opposite end of the first sleeve portion of the brace member.

3. A table assembly according to claim 1, wherein the mounting means comprise a base rigidly connectable to the fixed structure for removably receiving a lower end of the first supporting member, and an upper anchoring assembly for removably connecting an upper end of the first supporting member to the fixed structure, the upper anchoring assembly comprising an anchoring tip, attached to the upper end of the first supporting member, connectable to a mounting bracket, itself rigidly connectable to the fixed structure.

4. A table assembly according to claim 3, wherein the anchoring tip and the mounting bracket are connectable together in a locking engagement by means of a locking member.

5. A table assembly according to claim 1, further comprising at least one safety stopper located at a given height along the first supporting member for preventing the brace member from accidentally dropping from a normal operation position all the way down to a base upon a mishandling of the table assembly.

6. A table assembly according to claim 5, wherein the safety stopper is inserted in a corresponding channel inside the first supporting member and has an outwardly biased portion projecting outside from a corresponding hole made in the first supporting member.

7. A table assembly comprising:

a first longitudinally grooved and elongated supporting member disposed substantially vertically, the first supporting member having a generally circular cross section;

a second longitudinally grooved and elongated supporting member disposed substantially horizontally, the second supporting member having a generally circular cross section;

a brace member for operatively connecting together the first and second supporting members, the brace member having a first sleeve portion slidably connected to the first supporting member and a second sleeve portion slidably connected to the second supporting member, the brace member comprising a first and a second tubular section, the first tubular section being coaxial with the first supporting member and downwardly projecting from the first sleeve portion of the brace member, the second tubular section being coaxial with the second supporting member and laterally projecting from the second sleeve portion of the brace member towards the distal end of the second supporting member;

a first locking means provided between the brace member and the first supporting member for removably locking the brace member with the first supporting member;

a second locking means provided between the second supporting member and the brace member for removably locking the second supporting member with the brace member, the second locking means comprising at least one second outwardly biased radial stopper movable through a corresponding hole of the second tubular section upon rotation of a second eccentric ring mounted around the second tubular section in front of the second stopper, the second stopper having a first position away from the second supporting member for allowing free rotation and translation of the second support member with reference to the brace member, a second position where the second stopper is set into one longitudinal groove of the second supporting member for only preventing the second supporting member from rotating in the brace member, and a third position where the second stopper is extending inside one of a plurality of second adjustment holes provided at different locations on the second supporting member for further preventing translation of the second supporting member with reference to the brace member;

a table plate connected to a distal end of the second supporting member; and mounting means for removably connecting the first supporting member to a fixed structure.

8. A table assembly according to claim 7, further comprising a third and a fourth guiding member connected to the brace member and coaxial with the second supporting member for guiding movements of the second supporting member in the brace member, the third and the fourth guiding means having an inner diameter slightly larger than the second supporting member, the third guiding member being interlocked with the second tubular section and holds the second eccentric ring, the fourth guiding member being connected to an opposite end of the second sleeve portion of the brace member.

9. A table assembly according to claim 7, wherein the mounting means comprise a base rigidly connectable to the fixed structure for removably receiving a lower end of the first supporting member, and an upper anchoring assembly for removably connecting an upper end of the first supporting member to the fixed structure, the upper anchoring assembly comprising an anchoring tip, attached to the upper end of the first supporting member, connectable to a mounting bracket, itself rigidly connectable to the fixed structure.

10. A table assembly comprising:

a first longitudinally grooved and elongated supporting member disposed substantially vertically, the first supporting member having a generally circular cross section;

a second longitudinally grooved and elongated supporting member disposed substantially horizontally, the second supporting member having a generally circular cross section;

a brace member for operatively connecting together the first and second supporting members, the brace member having a first sleeve portion slidably connected to the first supporting member and a second sleeve portion slidably connected to the second supporting member, the brace member comprising a first and a second tubular section, the first tubular section being coaxial with the first supporting member and downwardly projecting from the first sleeve portion of the brace member, the second tubular section being coaxial with the second supporting member and laterally projecting from the second sleeve portion of the brace member towards the distal end of the second supporting member;

a first locking means provided between the brace member and the first supporting member for removably locking the brace member with the first supporting member;

a second locking means provided between the second supporting member and the brace member for removably locking the second supporting member with the brace member, the second locking means comprising at least one second outwardly biased radial stopper movable through a corresponding hole of the second tubular section upon rotation of a second eccentric ring mounted around the second tubular section in front of the second stopper, the second stopper having a first position away from the second supporting member for allowing free rotation and translation of the second support member with reference to the brace member, a second position where the second stopper is set into one longitudinal groove of the second supporting member for only preventing the second supporting member from rotating in the brace member, and a third position where the second stopper is pressed against the corresponding groove for further preventing translation of the second supporting member with reference to the brace member by friction contact;

a table plate connected to a distal end of the second supporting member; and mounting means for removably connecting the first supporting member to a fixed structure.

11. A table assembly according to claim 10, wherein the mounting means comprise a base rigidly connectable to the fixed structure for removably receiving a lower end of the first supporting member, and an upper anchoring assembly for removably connecting an upper end of the first supporting member to the fixed structure, the upper anchoring assembly comprising an anchoring tip, attached to the upper end of the first supporting member, connectable to a mounting bracket, itself rigidly connectable to the fixed structure.

* * * * *